United States Patent [19]

Friel

[11] Patent Number: 5,731,377
[45] Date of Patent: Mar. 24, 1998

[54] POLYMER BLEND

[75] Inventor: John Michael Friel, Warminster, Pa.

[73] Assignee: Rohm and Haas Company, Phila., Pa.

[21] Appl. No.: 527

[22] Filed: Jan. 8, 1993

Related U.S. Application Data

[63] Continuation of Ser. No. 548,035, Jul. 5, 1990, abandoned.
[51] Int. Cl.⁶ .................. C08J 3/00; C08K 3/20; C08L 33/00; C08L 33/02
[52] U.S. Cl. .................. 524/522; 524/523; 525/221; 525/228; 525/230
[58] Field of Search .................. 525/221, 228, 525/230; 524/522, 523

[56] References Cited

U.S. PATENT DOCUMENTS

| | | |
|---|---|---|
| 3,356,627 | 12/1967 | Scott . |
| 4,283,320 | 8/1981 | Carroll et al. .......... 524/522 |
| 4,774,291 | 9/1988 | Maeda .......... 524/522 |
| 4,783,498 | 11/1988 | Padget et al. .......... 524/523 |

FOREIGN PATENT DOCUMENTS 0154779  4/1982  Germany .

OTHER PUBLICATIONS

Rohm & Haas Company Product Bulletin, "Rhoplex®B-85", Jun. 1974.

Rohm & Haas Company Product Bulletin, "Rhoplex®C-72", Jun. 1974.

*Primary Examiner*—Patrick D. Niland
*Attorney, Agent, or Firm*—Marc S. Adler, Patent Attorney; Ronald D. Bakule, Patent Agent

[57] ABSTRACT

A polymer blend useful as a binder in an aqueous coating composition containing no coalescent is provided. The polymer blend comprises from about 20 to about 60 weight percent of a hard emulsion polymer, having a glass transition temperature greater than about room temperature, and from about 80 to about 40 weight percent of a soft emulsion polymer, having a glass transition temperature less than about 15 degrees Centigrade.

9 Claims, No Drawings

POLYMER BLEND

This application is a continuation of application Ser. No. 07/548,035, filed Jul. 5, 1990 abandoned.

FIELD OF THE INVENTION

This invention relates to a blend of emulsion polymers useful as a film forming binder component in an aqueous coating composition which does not require the presence of volatile organic solvents More particularly, the invention is directed to the selection of at least two emulsion polymers, having different glass transition temperatures, in certain selected weight ratios, which when blended together permit the formulation of an aqueous coating composition having good film properties without the use of a coalescent

BACKGROUND OF THE INVENTION

Aqueous based coatings, such as for example latex or emulsion polymer containing paints, constitute a significant segment of all coatings in use today. Aqueous based coatings offer the advantages of being generally easier to use than conventional oil based coatings, such as for example alkyd paints, and contain less undesirable volatile organic solvents. Formulators of aqueous based coatings desire to match or improve upon the performance properties of alkyd-based coatings including their hardness and gloss characteristics The glass transition temperature ("$T_g$") of a polymer is an inherent physical property of the monomer or monomers used to make the polymer. The $T_g$ of a polymer determines the relative hardness or softness of the polymer. The higher the polymer's $T_g$ the harder the polymer is, and the lower the polymer's $T_g$ the softer. The $T_g$ of a polymer determines both the physical characteristics of a film formed from a coating composition containing the polymer as well as the minimum temperature at which the coating composition containing the polymer can be applied to a substrate to form a film. For example, in the case of a pigmented architectural coating, two important physical characteristics of the coating are its hardness and its desired degree of gloss. The hardness of a pigmented coating is a function of both the $T_g$ of the polymeric binder and the amount of the pigment used in the coating composition. Coatings having a high degree of gloss typically contain relatively lower concentrations of pigment than less glossy coatings and, therefore, the contribution of the polymeric binder to the final hardness of the coating is more important than in less glossy coatings. Increasing the $T_g$ of the polymeric binder used in a coating will increase both the gloss and the hardness of the final coating. However, if the $T_g$ of the polymer, selected to provide the coating with the desired high degree of gloss or hardness, is above the minimum temperature required for the coating to form a film, hereinafter referred to as the "Minimum Film Formation Temperature" or "MFT") a dilemma is created. If the polymer $T_g$ is selected for its ability to contribute hardness to the coating, but the coating will not form a film at the temperatures at which it is to be applied, the coating formulation is not useful regardless of the desirability of the film properties which could be achieved if the coating were to be applied at a temperature equal to or above the minimum film formation temperature. Likewise, if the polymer is selected solely based on its ability to form a good film at low temperatures, the coating will form a film at the temperature at which it is to be applied, but the film thus formed will not necessarily have the desired physical properties.

The conventional way which this problem has been solved by aqueous coating formulators is to utilize a coatings binder polymer which will yield the physical properties which are desired and to address the film formation problem of the polymer separately. This is accomplished through the incorporation of additives in the coating formulation. These additives act by effectively reducing the apparent $T_g$ of the polymer thereby permitting the coating to form a useful film at a temperature below the real $T_g$ of the polymer. The additives which have been selected by aqueous coating formulators for this purpose are conventional volatile organic solvents. The volatile organic solvent additive acts as a plasticizer for the polymeric binder. By this I mean that the additive solubilize the polymer and reduces the apparent $T_g$ of the polymer. This apparent reduction in the polymer's $T_g$ permits the formulator to form a film in a reasonable amount of time at a temperature at which the polymer would ordinarily not form a film while at the same time preserving the desired physical properties of the film so formed. The physical properties of the film are preserved because after the coating is applied to a substrate, the coalescent evaporates from the film as the film dries. Thus a film can be formed by the assistance of the coalescent additive without concern to the polymeric binder's real $T_g$. Coalescents, such as for example 2,2,4-trimethyl-1,3-pentanediol monoisobutyrate (Texanol), are typically employed in coating formulations at concentrations of from about 3 to about 20 percent by weight on weight of the polymeric binder solids. The concentration of the coalescent typically increases within this range as the desired degree of gloss of the coating increases.

While this has been a very useful way to solve the problem associated with obtaining certain desired film properties with high $T_g$ polymers which do not readily form films at desired application temperatures, this solution has created another problem. This new problem is associated with the evaporation of these organic solvents additives and their entering the atmosphere. In addition to the unpleasant odor associated with these organic solvents, there is a growing concern about the potentially adverse environmental and health effects of many of these organic solvents. Since latex coatings have been developed in the first instance for use in aqueous based coatings as an improvement to oil based coatings containing volatile organic solvents, it is an object of water based coatings formulators to further reduce or eliminate the presence of such volatile organic solvents in aqueous based coatings.

It was an object of the present invention to develop a polymeric binder for use in aqueous based coatings which eliminates the need for volatile organic solvent coalescent.

It was an additional object of the invention to accomplish the above without reducing the physical properties of the aqueous coating or severely increasing its cost of manufacture.

These objects and others will become more readily apparent from the detailed description which follows.

SUMMARY OF THE INVENTION

A polymer blend of at least two emulsion polymers useful as a binder in an aqueous coating composition containing no coalescent, where the polymer blend comprises from about 20 to about 60 weight percent of a hard emulsion polymer, having a glass transition temperature greater than about room temperature, and from about 80 to about 40 weight percent of a soft emulsion polymer, having a glass transition temperature less than about 15 degrees Centigrade.

The polymer blend is particularly useful in preparing an aqueous coating composition which can be applied at low temperatures while providing good block resistance, as for example in the preparation of interior semi-gloss paints.

DETAILED DESCRIPTION OF THE INVENTION

I have found that blending at least one relatively soft emulsion polymer with at least one relatively hard emulsion polymer in selected weight ratios is an effective method for producing a polymeric binder useful in aqueous coating compositions which does not require the presence of volatile organic solvent coalescent.

This invention is the result of the recognition for the need to eliminate volatile organic solvent coalescent in aqueous based coatings combined with my understanding how to advantageously apply the relationship between the glass transition temperature of emulsion polymers and the minimum film formation temperature of coatings.

The minimum film formation temperature of a coating is determined experimentally as by using an apparatus described by T. F. Protzman and G. L. Brown in *J.Appl. Polymer Sci.*. 4.81 (1960). This apparatus is essentially an aluminum slab in which a constant and uniform temperature gradient may be maintained. The coating composition to be measured is spread uniformly in one of several sample wells. The point at which the film becomes discontinuous when dry is observed and this temperature is recorded as the minimum film formation temperature (MFT). To insure that the films are actually continuous when formed above the MFT, the films are scraped with a knife edge moving in the direction from low to high temperature. Below the MFT the material chips off the bar easily but above the MFT the coating does not lift off the bar. The transition between easily chipped to strong coating takes place at the MFT.

The minimum film formation temperature of a polymeric blend is not, however, what might be expected from a weighted average of the minimum film formation temperatures of each polymeric component in the blend. I found that the minimum film formation temperature of a polymeric blend is principally determined by the minimum film formation temperature of the polymer which acts as the continuous phase in the blend. The implications of this relationship relative to eliminating the need for a coalescent in certain aqueous coatings formed the basis for the present invention. For example, I postulated that if the minimum film formation temperature of a polymer blend is determined principally by the minimum film formation temperature of the continuous phase, and if the continuous phase of the polymer blend is composed of a relatively soft polymer, then it might be possible to achieve the desired physical properties of the final coating by blending that polymer, as the continuous phase, with a smaller amount of a relatively harder polymer, as the dispersed phase, while at the same time eliminating the need for a coalescent.

In order to test out this hypothesis I selected two variables for evaluating the effectiveness of emulsion polymer blends useful as aqueous coating binders: minimum film formation temperature and block resistance. Blocking refers to the tendency of painted surfaces to stick together when placed in contact with each other under pressure. It is important for an interior paint to have good resistance to blocking (block resistance) especially when painted surfaces of doors and windows come into contact. The block resistance of a paint depends on the polymer's hardness and external factors such as pressure, temperature, humidity and drying conditions such as for example, air flow. Block resistance is tested by placing two painted surfaces in contact with each other (either stacked or face to face) under a fixed pressure for a given time and temperature. The two surfaces are then separated and their surface appearance is visually rated for their resistance to being stuck together from a worst case (1) to best case (10). By varying the composition and relative weight concentrations of the continuous phase polymer and the dispersed phase polymer I was able to form polymer blends which could be applied at low temperatures while at the same time obtaining desirable film properties without the need for a coalescent. In addition to eliminating the need for a coalescent, I also found that the emulsion polymers could be simply blended together without phase separation occurring in the final film. This result demonstrated the versatility of the invention.

I found that if a soft emulsion polymer is blended with increasing amounts of a hard emulsion polymer, the MFT of the blend will remain about equal to the MFT of the soft polymer until the hard polymer is about 50% of the polymer blend. Below 50 weight percent hard polymer the soft polymer is the continuous phase and the hard polymer is the dispersed phase. Above 50 weight percent hard polymer, the hard polymer becomes the continuous phase and the soft polymer becomes the dispersed phase, and the MFT of the polymer blend begins to increase rapidly as more hard polymer is added until the MFT of the blend is equal to the MFT of the hard polymer.

In the practice of the invention the relative weight percentages of the soft polymer and hard polymer in the polymer blend range from about 20 to about 60 weight percent hard polymer to from about 80 to about 40 weight percent soft polymer. Preferably the weight percentage of hard polymer to soft polymer is in the range of from about 20 to about 40 weight percent hard polymer and from about 80 to about 60 weight percent soft polymer.

The polymer blend of the invention must contain at least one soft polymer and at least one hard polymer. The polymers may be homopolymers or copolymers. The polymers are preferably prepared by conventional aqueous emulsion polymerization techniques well known in the art. The polymers used in the illustrative examples which follow were prepared by a gradual addition emulsion polymerization technique, using an anionic surfactant, to control the particle size, stability and performance of the polymers. Suitable anionic surfactants useful in the process include for example: sulfates of fatty alcohols, such as for example lauryl sulfate; sulfation products of oxylated alkylphenols, preferrably oxyethylated alkylphenols where the alkyl group contains 8 to 12 carbon atoms such as for example octylphenol, nonyl phenol and dodecyl phenol; water soluble alkali metal salts of fatty acids, such as for example sodium stearate and sodium oleate; and sulfonated and alkylated biphenyl ethers. Ureido-functional monomers, as described in U.S. Pat. No. 4,777,265, and references cited therein, are also preferably employed. Buffers for pH control, and post polymerization addition of initiator to remove residual unreacted monomers may also be preferably employed.

The term "soft" polymer and the term "hard" polymer are used herein in a relative fashion to differentiate between the two polymers. The specific degree to which the soft polymer is "soft" and the hard polymer is "hard" is determined by the calculated $T_g$'s of the polymers.

The soft polymer must have a $T_g$ such that the polymer will form a film when applied to a substrate. The soft polymer should have a $T_g$ as low as about minus 20 degrees Centigrade to about room temperature, about plus 20 degrees Centigrade. Preferably the soft polymer should have $T_g$ in the range of from about minus 5 degrees Centigrade to about plus 10 degrees Centigrade, and most preferably from about 0 degrees Centigrade to about plus 5 degrees Centigrade.

The hard polymer is required to be present in the blend to provide the film with the desired physical properties, such as for example hardness and block resistance. The $T_g$ of the hard polymer should be greater than room temperature, preferably greater than about 25 degrees Centigrade, and most preferably in the range of from about 25 to about 65 degrees Centigrade.

The $T_g$ of the soft polymer and the hard polymer can be approximated from the published $T_g$ values of the constituent monomers using, in the case of copolymers, the Fox equation ($1/T_{g\ COPOLYMER}=1/T_{g\ monomer\ A}+1/T_{g\ monomer\ B}+1/T_{g\ monomer\ n\ [(etc.)]}$). More accurately, the $T_g$'s can be measured using Differential Scanning Calorimetry.

One or more of the monomers used to form the soft polymer may have a $T_g$ in excess of the calculated $T_g$ of the copolymer, and likewise one or more of the monomers used to form the hard polymer may have a $T_g$ less than the calculated $T_g$ of the hard polymer, provided that the overall Tgs of the soft polymer and the hard polymer are within the ranges set forth above.

When the soft polymer and the hard polymer are copolymers they may be prepared using some of the same monomers but in different proportions depending upon the Tgs of each monomer. The polymers are prepared from conventional ethylenically unsaturated monomers typically used in the preparation of polymeric latex binders for use in coatings. These monomers include, for example, lower alkyl ($C_1$–$C_{10}$) acrylates, lower alkyl ($C_1$–$C_{10}$) methacrylates, styrene, alpha-methyl styrene, other substituted styrenes, ethylene, isoprene, butadiene, vinyl chloride, vinylidene chloride, acrylonitrile, vinyl acetate, acrylic and methacrylic acid, and the like. The polymers may additionally be formed using monomers known to increase the adhesion of the polymer to substrate surfaces, also known in the art as adhesion promoters, such as for example ureido functional monomers.

I have found that the polymer blend of the invention may be prepared from soft and hard copolymers formed from the same monomers but in different weight ratios.

More particularly, I have found that when the soft polymer is a copolymer formed from butyl acrylate and styrene or from butyl acrylate and methylmethacrylate, having a Tg on the order of about 0–6 degrees C., the hardness and block resistance of a film prepared therefrom can be substantially increased by the blending of such soft polymers with about 40 weight percent of a hard polymer, having a Tg on the order of from about 20 to about 60 degrees C., formed from butyl acrylate and methylmethacrylate or butyl acrylate and styrene or from ethylhexyl acrylate, styrene and acrylonitrile.

I have also found that the physical properties of the coating prepared from the polymer blend of the invention, such as for example block resistance, can be improved using the same concentration of hard polymer, or maintained using a lower concentration of the hard polymer, if the particle size difference between the soft polymer and the hard polymer is maximized as disclosed in U.S. Pat. No. 3,356,627. For example, in the case of butyl acrylate/methyl methacrylate copolymers used as both the soft polymer and the hard polymer, I found that the block resistance of the coating can be improved using 20% hard polymer if the average particle size of the soft polymer is relatively large, such as for example, having a diameter of about 530 nanometers and the average particle size of the hard polymer is relatively small, such as for example having a diameter of about 120 nanometers, as compared to the results obtained when the average particle size of both polymers is the same, such as for example when their diameters are about 120 nanometers.

The preferred composition of the polymer blend of the invention occurs when the soft polymer comprises 60 weight percent of the blend and has a $T_g$ of about 4 degrees C. and when the hard polymer comprises 40 weight percent of the blend and has a $T_g$ of about 64 degrees C., and where both the soft polymer and the hard polymer are formed from butyl acrylate, styrene, methacrylic acid and methyl methacrylate.

The following examples are presented to illustrate the invention. These examples are not intended, nor should be construed as limiting the invention, as variations on these examples within the above description are believed to be obvious to one of ordinary skill in the art.

EXAMPLE 1

Preparation of hard and soft emulsion polymers

The polymers used in the examples which follow were prepared by a standard emulsion polymerization processes as described herein.

BA/MMA or BA/ST/MMA Polymers

To a 5 liter stirred reactor was added 1000 grams (g) deionized water (DI water) and 2.5 g of an anionic surfactant. To the stirred mixture at 85° C. was added 92 g of Monomer Emulsion (ME), an initial charge of ammonium persulfate initiator in 100 g DI water, followed by adding sodium carbonate in 100 g DI water, in the amounts indicated below in Table 1. The remainder of the ME was added gradually over 3.5 hours along with a solution of ammonium persulfate in 150 g DI water(cofeed), while temperature was maintained between 80° and 85° C. for another half hour. The final reaction mixture was cooled while additional initiator was added to remove residual monomers and then neutralized to pH 7 with 28% aqueous ammonia. A biocide solution was then added. Variations in the composition of the polymer samples and ingredients used in the process are shown in Table 1.

TABLE 1

| Ingredients (grams) | Sample Number | | | |
|---|---|---|---|---|
| | 1 | 2 | 3 | 4 |
| Monomer Emulsion | | | | |
| DI Water | 460 | 460 | 460 | 460 |
| Anionic Surfactant | 18.7 | 18.7 | 18.7 | 18.7 |
| Butyl acrylate (BA) | 1105 | 459 | 969 | 459 |
| Methyl methacrylate (MMA) | 39.1 | 19.5 | 680 | 1190 |
| Styrene (St) | 496.4 | 1179 | 0 | 0 |
| Adhesion promoter | 17 | 8.5 | 17 | 17 |
| Methacrylic acid (MAA) | 42.5 | 34 | 34 | 34 |
| Other Ingredients | | | | |
| Ammonium persulfate (initial) | 7.3 | 6.8 | 2.6 | 2.6 |
| Sodium carbonate | 4.25 | 4.25 | 1.7 | 1.7 |
| Ammonium persulfate (cofeed) | 2.9 | 1.7 | 1.7 | 1.7 |
| Physical Poperties of Polymers | | | | |
| Viscosity (cps) | 40 | 25 | 30 | 23 |
| % Solids | 43.6 | 43.3 | 44.4 | 44.54 |
| Particle Size (nanometers) | 119 | 122 | 136 | 135 |
| Overall Composition | BA/ST/MAA/MMA | 27/69.4/2/1.1 | 57/0/40/2 | 27/0/2/70 |

A similar process was used to prepare 2-ethyl hexyl acrylate/styrene and 2-ethyl hexyl acrylate/styrene/acrylonitrile polymer samples as described below.

Sample 5: EHA/ST/AN Polymer (30 EHA/40 St/25 AN)

A monomer emulsion was prepared from 460 grams Deionized water, 18.7 grams anionic surfactant, 39.3 grams methyl methacrylate, 695.3 grams styrene (ST), 34 grams methacrylic acid (MAA), 510 grams 2-ethyl hexyl acrylate (EHA), 425 grams acrylonitrile (AN), and 34 grams of an ureido-containing adhesion promoting monomer. To a five liter stirred reactor was added 1400 grams Deionized water and 2.5 grams of an anionic surfactant. To the stirred mixture at 85 degrees C. was added 92 grams of the monomer emulsion, 2.6 grams ammonium persulfate in 50 grams Deionized water and 1.7 grams sodium carbonate in 100 grams Deionized water. The remainder of the monomer emulsion was added gradually over 3 hours along with a solution of ammonium persulfate in 150 grams Deionized water while maintaining the temperature between 80 and 85 degrees C. The final reaction mixture was cooled, residual monomer removed, and neutralized to pH 7 with 28% aqueous ammonia. The emulsion polymer obtained was 41.5% solids, had an average particle size of 121 nanometers and a Brookfield viscosity of 22 cps.

Sample 6: EHA/ST/AN Polymer (50 EHA/19 ST/25 AN)

A monomer emulsion was prepared from 460 grams Deionized water, 18.7 grams anionic surfactant, 39.3 grams methyl methacrylate, 350.2 grams styrene, 34 grams methacrylic acid, 855.1 grams 2-ethyl hexylacrylate, 425 grams acrylonitrile (AN) and 34 grams of a ureido-containing adhesion promoting monomer. To a five liter stirred reactor was added 1400 grams Deionized water and 2.5 grams of an anionic surfactant. To the stirred mixture at 85 degrees C. was added 92 grams of the monomer emulsion, 2.6 grams ammonium persulfate in 50 grams Deionized water, and 1.7 grams sodium carbonate in 100 grams deionized water. The remainder of the monomer emulsion was added gradually over 3 hours along with a solution of ammonium persulfate in 150 grams Deionized water while maintaining the temperature between 80 to 85 degrees C. The final reaction mixture was cooled, residual monomer removed, and neutralized to pH 7 with 28% aqueous ammonia. The emulsion polymer obtained was 40.5% solids, had a particle size of 121 nanometers and a Brookfield viscosity of 20 cps.

Sample 7 BA/ST Polymers (57 BA/38 ST)

A monomer emulsion was prepared from 460 grams Deionized water, 18.7 grams anionic surfactant, 39.3 grams methyl methacrylate, 640.9 grams styrene, 34 grams methacrylic acid, 969 grams butyl acrylate, and 16.8 grams of a ureido-functional adhesion promoting monomer. To a 5 liter stirred reactor was added 1400 grams deionized water, and 2.5 grams of an anionic surfactant. To the stirred reactor at 82 degrees C. was added 92 grams of the monomer emulsion, 2.6 grams ammonium persulfate in 50 grams deionized water and 1.7 grams sodium carbonate in 50 grams deionized water. The remainder of the monomer emulsion was added to the reactor over 3.5 hours along with a solution of 1.7 grams ammonium persulfate in 150 grams deionized water while the temperature was maintained between 80 to 85 degreees C. The final reaction mixture was cooled and neutralized to pH 7 with 28% aqueous ammonia. The emulsion polymer obtained was 41.3% solids, 111 nanometers average particle size diameter, and had a Brookfield viscosity of 22 cps.

This process was also employed to prepare two other BA/ST emulsion polymers having the composition 61 BA/34 ST and 61 BA/36 ST, respectively. These polymers were evaluated and are identified by their overall composition in the following application example.

Sample 8- BA/ST (48 BA/47 ST)

A monomer emulsion was prepared from 460 grams deionized water, 18.7 grams anionic surfactant, 39.3 grams methyl methacrylate, 793.9 grams styrene, 34 grams methacrylic acid, 816 grams butyl acrylate and 16.8 grams ureido-functional adhesion promoting monomer. To a five liter stirred reactor was added 1400 grams deionized water and 2.5 grams anionic surfactant. To the stirred reactor at 82 degrees C. was added 92 grams of the monomer emulsion, 2.6 grams ammonium persulfate in 50 grams deionized water, and 1.7 grams sodium carbonate in 50 grams deionized water. The remainder of the monomer emulsion was added over 3.5 hours along with a solution of 1.7 grams ammonium persulfate in 150 grams deionized water while the temperature was maintained between 80 and 85 degrees C. The final reaction mixture was cooled and neutralized to pH 7 with 28% aqueous ammonia. The emulsion polymer was 40.7% solids, had an average particle size diameter of 110 nanometers and a Brookfield viscosity of 20 cps.

EXAMPLE 2

Paint Formulation

The hard/soft polymer blends of the invention were evaluated (as shown in the examples which follow) in a standard paint formulation having the following composition.

TABLE 2

| Material | Material Type | lb | gal. |
|---|---|---|---|
| 1,2 Propanediol | Solvent | 72.00 | 8.32 |
| Sodium Salt of Polymeric Carboxylic Acid (35%) in H$_2$O | Dispersant | 13.63 | 1.48 |
| Petroleum Derivatives & Additives | Defoamer | 1.00 | 0.13 |
| Rutile Titanium Dioxide | Pigment | 267.64 | 8.03 |
| Water | | 30.00 | 3.60 |
| Latex Blend (as identified below) | | 531.99 | 61.98 |
| Dioctyl Sodium Sulfosuccinate (75%) in Ethanol and H$_2$O | Surfactant | 1.71 | 0.21 |
| Water | | 10.00 | 1.20 |
| 50% Aqueous Solution of | Biocide | 2.00 | 0.21 |

TABLE 2-continued

| Material | Material Type | lb | gal. |
|---|---|---|---|
| non-metallic organic compound Petroleum Derivatives & Additives | Defoamer | 1.00 | 0.13 |
| Polyurethane Resin (20%) in diethyleneglycol monobutyl ether (10%) and H$_2$O (70%) | Thickener | 32.60 | 3.91 |
| Water | | 90.00 | 10.80 |
| | | 1053.57 | 100.00 |

Pigment Volume Concentration = 23.65%
Volume Solids = 33.95%

EXAMPLE 3

This example demonstrates the effect of composition, hardness and polymer blend ratios on the properties of the polymer blends formed by mixing the emulsion polymer samples prepared according to example 1.

The data presented in Table 4 shows that soft BA/St and BA/MMA latexes (MFT=0–6) have low hardness and poor block resistance, however, by blending in approximately 40% of a hard latex (MFT=60), whether BA/ST or 2-ethyl hexyl acrylate(EHA)/ST/acrylonitrile(AN), block resistance and hardness are upgraded, and MFT does not significantly increase. This holds true whether the soft phase is BA/ST or BA/MMA.

TABLE 4

| | MFT °C. | Soft/ Hard Ratio | Blend MFT °C. | Block Resistance | | Tukon Hardness | Low Temp. Film Formation Cracking Over Bare |
|---|---|---|---|---|---|---|---|
| | | | | 1 Day RT | 7 Day/ 100° F. | (1 wk dry) KHN | Pine @ 46° F. |
| I. Soft Phase | | | | | | | |
| Sample 7 | 6 | | | 0/0 | 0/0 | 0.8 | none |
| Sample 3 | 1 | | | 0/0 | 0/0 | 1.0 | none |
| II. Blends with 57 BA/28 ST Hard Phase | | | | | | | |
| Sample 6 | 22 | 80/20 | 7.8 | 3+/0 | 0/0 | 1.0 | none |
| Sample 6 | 22 | 60/40 | 7.1 | 3/3 | 2/3 | 1.2 | trace |
| Sample 5 | 59 | 80/20 | 7.3 | 2/1 | 1/2 | 1.0 | none |
| Sample 5 | 59 | 60/40 | 6.2 | 9+/9 | 8/8 | 1.9 | v-slt |
| Sample 8 | 19 | 80/20 | 7.3 | 0/0 | 0/0 | 1.0 | trace |
| Sample 8 | 19 | 60/40 | 7.3 | 1/0 | 0/0 | 1.2 | slight |
| Sample 2 | 61 | 80/20 | 7.8 | 2/3 | 3/3 | 1.2 | trace |
| Sample 2 | 61 | 60/40 | 9.35 | 8+/9 | 9/9 | 2.7 | mod-hvy |
| III. Blends with Sample 3 | | | | | | | |
| Sample 6 | 22 | 80/20 | 1.6 | 1/1 | 1/2 | 1.0 | none |
| Sample 6 | 22 | 60/40 | 5.7 | 2/3 | 1/1 | 1.2 | none |
| Sample 5 | 59 | 80/20 | 2.3 | 1/2 | 3/3 | 1.3 | none |
| Sample 5 | 59 | 60/40 | 6.0 | 8/8 | 8+/9 | 2.0 | none |
| Sample 8 | 19 | 80/20 | 1.5 | 0/0 | 0/0 | 1.1 | none |
| Sample 8 | 19 | 60/40 | 3.6 | 1/1 | 1/2 | 1.2 | none |
| Sample 2 | 61 | 80/20 | 1.8 | 0/2 | 3/3 | 1.1 | none |
| Sample 2 | 61 | 60/40 | 6.1 | 9/10 | 9+/9 | 2.3 | none |
| IV. Control[1] | 35 | | | 9/8+ | 6+/6+ | 1.6 | slight |

[1]Control polymer had the composition: 10 EA/35 BA/48.8 ST/3.7 MMA/2 MAA/0.5 ureido functional monon
BA = Butylacrylate
EHA = 2-ethlhexylacrylate
St = Styrene
AN = acrylonitrile
MMA = Methymethacrylate

EXAMPLE 4

This example demonstrates that blends containing a minimum amount of 30% of Tg=63 hard phase is needed for the block resistance to begin to improve. At 40% hard phase, block resistance is good. In addition the BA/St blends containing a soft phase with a Tg=15 showed heavy cracking in the low temperature film formation test, but no cracking was observed when using a Tg=4 soft phase. A Tg=9 soft phase gave intermediate results. BA/MMA blends gave good film formation (no cracking) when the phase has a Tg of 10.

TABLE 5

EFFECT OF SOFT PHASE TG AND BLEND RATIOS ON BLEND PROPERTIES COMPARISON OF BA/ST VS. BA/MMA

| Composition | $Tg^1$ | Block resistance | | Low Temp. Film Formation |
|---|---|---|---|---|
| | | 1 Day RT | 7 Day/ 100° F. | Cracking Over Bare Pine @ 46° F |
| I. Soft Phase | | | | |
| Sample 7 | 14.9 | 0/0 | 0/0 | none |
| 61 BA/34 St | 8.8 | 0/0 | 0/0 | none |
| Sample 1 | 4.3 | 0/0 | 0/0 | none |
| Sample 3 | 10.8 | 0/0 | 0/0 | none |
| 61 BA/36 MMA | 1.8 | 0/0 | 0/0 | none |
| II. Cold Blends with Hard BA/St$^2$ (MFT = 60° C./TG = 63.7°) | | | | |
| Soft Phase | Soft/Hard Ratio | | | |
| Sample 7 | 70/30 | 3+/3+ | 3+/3+ | heavy |
| Sample 7 | 65/35 | 8+/8 | 4/6 | heavy |
| Sample 7 | 60/40 | 8+/9 | 9/9 | heavy |
| 61 BA/34 St | 60/40 | 8/8+ | 8+/8+ | slight |
| Sample 1 | 70/30 | 3/3 | 3+/4 | none |
| Sample 1 | 65/35 | 4+/4+ | 4+/5 | none |
| Sample 1 | 60/40 | 8/8+ | 6/7 | none |
| III. Cold Blends with Hard BA/MMA$^3$ (MFT = 60° C./Tg = 60.4°) | | | | |
| Sample 3 | 60/40 | 8+/8 | 9/9 | none |
| 61 BA/34 MMA | 60/40 | 9/9 | 9/9 | none |
| IV. Control$^4$- | | 4+/5 | 5/5 | mod–hvy |
| Control$^5$- | | 4/4 | 4+/5 | sl–mod |

$^1$DSC Inflectin °C.
$^2$Sample 2
$^3$Sample 4
$^4$Control polymer had the composition: 10 EA/35 BA/48.8 ST/3.7 MMA/2 MAA/0.5 ureido functional monomer
$^5$Control was a blend of two polymers: polymer 1 (96% of blend) was 57 EA/41.7 MMA/1.3 MAA polymer 2(4%) was 43.4 BA/51.1 MMA/2 AA/3.5 ureido functional monomer

What is claimed is:

1. A method for coating a substrate with a paint containing no volatile organic solvent coalescent comprising:
   a) forming an aqueous emulsion polymer-containing paint composition containing no volatile organic solvent coalescent by the addition to an aqueous composition a polymeric blend of at least one hard emulsion polymer having a glass transition temperature greater than about 20 degrees Centigrade and at least one soft emulsion polymer having a glass transition temperature less than about 15 degrees Centigrade, where the polymeric blend contains from about 20 to about 60 weight percent of the hard emulsion polymer and from about 80 to about 40 weight percent of the soft emulsion polymer; and
   b) applying the paint composition to a substrate.

2. The method of claim 1 wherein said polymeric blend comprises from about 20 to about 40 weight percent of said hard emulsion polymer and from about 80 to about 60 weight percent of said soft emulsion polymer.

3. The method of claim 1 wherein said polymeric blend comprises a hard emulsion polymer having a glass transition temperature of from about 25 to about 65 degrees cCentigrade, and a soft emulsion polymer having a glass transition temperature of from about 10 degrees Centigrade to about minus 5 degrees Centigrade.

4. The method of claim 1 wherein said soft emulsion polymer comprises 60 weight percent of the polymeric blend and has a glass transition temperature of about 5 degrees C. and where said hard emulsion polymer comprises 40 weight percent of the polymeric blend and has a glass transition temperature of about 65 degrees C., and where both the soft emulsion polymer and the hard emulsion polymer are each copolymers formed from butyl acrylate, styrene, methacrylic acid and methyl methacrylate.

5. The method of claim 1 wherein said hard emulsion polymer and said soft emulsion polymer are each copolymers formed from the same monomers.

6. The method of claim 1 wherein said hard emulsion polymer is a copolymer formed from monomers selected from the group consisting of butyl acrylate, styrene, methacrylic acid, methyl methacrylate, 2-ethylhexyl acrylate and acrylonitrile.

7. The method of claim 5 wherein said hard emulsion polymer and said soft emulsion polymer are copolymers and where each of said copolymers are formed from butyl acrylate and methyl methacrylate monomers.

8. The method of claim 7 wherein the difference between the average particle size diameter of the soft emulsion polymer and said hard emulsion polymer is maximized.

9. The method of claim 8 where the average particle size diameter of said soft emulsion polymer is about 530 nanometers and the average particle size diameter of said hard emulsion polymer is about 120 nanometers.

* * * * *